United States Patent [19]
Allen et al.

[11] Patent Number: 5,958,197
[45] Date of Patent: Sep. 28, 1999

[54] CATALYSTS FOR GAS DIFFUSION ELECTRODES

[75] Inventors: Robert J. Allen, Saugus; Daniel Czerwiec, Framingham; James R. Giallombardo, Beverly; Khaleda Shaikh, Woburn, all of Mass.

[73] Assignee: De Nora S.p.A., Italy

[21] Appl. No.: 09/013,080

[22] Filed: Jan. 26, 1998

[51] Int. Cl.⁶ .................................... C25B 11/00
[52] U.S. Cl. ................ 204/290 R; 204/283; 204/284; 502/161; 205/618; 205/620; 205/621; 205/622; 205/624; 205/625; 205/543
[58] Field of Search .................... 204/282, 283, 204/284, 290 R; 502/161; 205/618, 620, 621, 622, 624, 625, 543; 429/40, 44

[56] References Cited

U.S. PATENT DOCUMENTS

| | | | |
|---|---|---|---|
| 4,795,727 | 1/1989 | Bach et al. | 502/161 |
| 5,411,641 | 5/1995 | Trainham, III et al. | 205/618 |
| 5,618,392 | 4/1997 | Furuya | 204/290 R |
| 5,716,437 | 2/1998 | Denton et al. | 204/282 |

*Primary Examiner*—Bruce F. Bell
*Attorney, Agent, or Firm*—Bierman, Muserlian and Lucas

[57] ABSTRACT

A gas diffusion electrode comprising an electrically conductive web provided on at least one side thereof with a coating containing a rhodium—rhodium oxide catalyst on a carbon black support and a method for the preparation of the rhodium—rhodium oxide catalyst.

20 Claims, 8 Drawing Sheets

CATALYSTS FOR GAS DIFFUSION ELECTRODES

FIELD OF THE INVENTION

Novel rhodium based catalysts for gas diffusion electrodes operative in highly corrosive environments having unexpected and desirable properties and use of the same for gas diffusion electrodes as oxygen depolarized cathodes in electrolytes containing mixtures of hydrogen chloride and chlorine.

STATE OF THE ART

A gas diffusion electrode (GDE) consumes or is depolarized by a gas feed while allowing direct electronic transfer between the solid and gas phase. Together with the electrolyte, the GDE provides a path for ionic transfer, which is just as critical. GDEs are typically constructed from a conductive support such as a metal mesh, carbon cloth, or carbon paper which support is often called a web. The web is first coated with hydrophobic wet-proofing layers, and finally, a catalytic layer is applied most commonly to one face. While the catalytic layer can consist of very fine particles of a precious metal mixed with a binder, many rely on methods similar to that in Petrow et al. in U.S. Pat. No. 4,082,699 which teaches the use of finely divided carbon particles such as carbon black as the substrate for small (tens of angstroms) particles of the noble metal. Thus called a "supported" catalyst, this methodology has shown superior performance and utilization of the catalyst in electrochemical applications.

Often, GDEs are cited as key components in fuel cells wherein the anode is typically fed with hydrogen while the cathode is fed with oxygen or air. The resulting products are energy in the form of electricity, some heat and water. However, some have realized that the energy-producing quality of a fuel cell can be adapted to industrial electrochemical processes and thus save energy and hence reduce operating costs. GDEs also may allow the creation of a commodity directly from a gaseous feedstock. For example, Foller et al. (The Fifth International Forum on Electrolysis in the Chemical Industry, Nov. 10–14, 1991, sponsored by the Electrosynthesis Co., Inc.) describe the use of a GDE to create a 5% wt. hydrogen peroxide in caustic. In this case, oxygen is the feedstock and a specific carbon black is the catalyst.

A typical chlor-alkali cell used two solid electrodes to produce sodium hydroxide, hydrogen and chlorine. In this case, both the anode and cathode expended energy to evolve gas, and special measures were taken to keep the resulting hydrogen away from the chlorine to avoid a potentially explosive mixture. The typical chlor-alkali cathode can be replaced with an oxygen-depolarized cathode, as has been shown by Miles et al. in U.S. Pat. No. 4,578,159 and others. A cell run in such a manner saves approximately one volt, and the hydrogen/chlorine problem is eliminated. It has been long recognized that a silver catalyst is most efficacious with regard to producing reasonable current densities and long-term stability for oxygen depolarized cathodes run in alkaline environments.

Aqueous hydrochloric acid is an abundant chemical by-product and high-value chlorine can be recovered by oxidizing solutions of HCl, and thus the chlorine can be recycled as a feedstock to the chemical plant. Electrolysis becomes extremely attractive when the standard hydrogen-evolving cathode is substituted with an oxygen-consuming gas diffusion electrode due to the significant drop in energy consumption. A schematic of this process with a gas diffusion electrode is shown in FIG. 1. The ability of the gas diffusion electrode to operate successfully in this and the preceding examples is acutely dependent on 1) the nature and performance of the catalyst, and 2) the structure of the gas diffusion electrode.

The greatest limitation to the realization of the HCl/chlorine recovery process is obtaining a cathode catalyst capable of reducing oxygen at an appreciable current density while the catalyst still remains stable in the highly oxidizing and corrosive $HCl/Cl_2$ environment. While platinum is generally acknowledged as the best oxygen reduction catalyst, it is susceptible to chloride ion poisoning. More importantly, the combined complexing action of hydrogen chloride and dissolved chlorine gas changes the platinum metal into a soluble salt which is dissolved away, making this material inappropriate for use in gas diffusion electrodes.

Other platinum group metals appear to follow a similar fats. For example, in Pourbaix's Atlas of Electrochemical Equilibria in Aqueous Solutions, finely divided rhodium metal dissolves in hot concentrated sulfuric acid, aqua regia, and oxygenated hydrochloric acid. Similarly, (hydrated) $Rh_2O_3 oSH_2O$ dissolved readily in HCl and other acids. However, anhydrous rhodium oxide is stable in acids, although no information is listed with regards to the highly oxidizing $HCl/Cl_2$ mixtures.

OBJECTS OF THE INVENTION

It is an object of the invention to provide novel gas diffusion electrodes with a noval rhodium/rhodium oxide catalyst therein having desirable and unexpected electrocatalytic properties.

It is another object of the invention to provide a novel electrolytic cell containing a gas diffusion electrode of the invention and to provide an improved method of electrolyzing hydrogen chloride to chlorine.

These and other objects and advantages of the invention will become obvious from the following detailed description.

THE INVENTION

The novel electrochemical electrodes of the invention are comprised of a web provided with a coating of a rhodium/rhodium oxide catalyst on at least one side thereof. The electrode catalyst may be used alone, with a binder, blended with a conductive support and a binder, or supported on a conductive support and combined with a binder. The binder may be hydrophobic or hydrophilic, and the mixture can be coated on one or both sides of the web. The web can be woven or non-woven or made of carbon cloth, carbon paper, or another conductive metal mesh.

Examples of high surface area supports include graphite, various forms of carbon and other finely divided supports but carbon black is preferred.

The electrodes are useful as gas diffusion electrodes with a simple structure for easy manufacture. The electrodes exhibit cell voltages, current densities and a lifetime that could not be previously obtained under normal operating conditions.

The electrode may be easily prepared by precipitating hydrated rhodium oxide, i.e. rhodium hydroxide $(Rh(OH)_3)$ or hydrated sesquioxide $(Rh_2O_3 oxH_2O)$, from an aqueous solution of a water soluble rhodium salt by adjusting the pH to alkaline by addition of a base such as dilute ammonium hydroxide solution. The resulting solids are recovered by filtration, washing and drying at 125° C., for example. The hydrated rhodium hydroxide obtained in this way is unsupported (unsupported catalyst). However, when the aqueous solution of the water soluble rhodium salt is added with a suspension of a suitable conductive support, then the hydrated rhodium hydroxide is preferentially deposited as tiny particles on the surface of the conductive particles (supported catalyst). The hydrated rhodium hydroxide is soluble in hydrogen chloride, so the solid is heated in an inert atmosphere at 550 to 650° C., preferably 575 to 625° C. and more preferably at about 600° C. or above to form an anhydrous form of rhodium/rhodium oxide catalyst. The heating may be for several hours depending on the size of the batch.

If the temperature is too low such as 300° C., the water is not completely removed and the catalyst is not stable in the presence of acids. If the temperature is too high, i.e., 725° C., the unsupported catalyst has excellent acid stability but is not electrically conductive enough.

In the case of the supported catalyst, when the support consists of carbon particles, in addition to removal of water of hydration, the heat treatment in an inert atmosphere is believed to perform another vital and unexpected function: formation of some fraction of rhodium metal in the rhodium oxide catalyst, due to the reducing action of the carbon itself, as shown in equation 1:

$$Rh_2 3 \text{ox} H_2 O + 3C => 2Rh° + 3CO + H_2 O \qquad \text{Equation 1}$$

The identification of rhodium metal as part of the rhodium oxide catalyst was verified using gravimetric analysis and ESCA (Electron Spectroscopy for Chemical Analysis). Equation 1 predicts a weight loss for the metal oxide that has been confirmed by applicants' measurements. Table 1 summarizes the ESCA results on supported catalyst, supported catalyst made into an electrode, and an electrode after activation and operation in the process. The GDE results are attenuated due to the polymer content of the electrode (see Examples). Clearly, the catalyst prepared as outlined above consists of a mixture of rhodium metal and rhodium oxide. This table also shows that an activation step may serve to enhance the rhodium metal content. The role of an activation step will be discussed later.

TABLE 1

ESCA analysis Rhodium peaks

| Sample | Rh° (metal) Atom % | Rh* (oxide) Atom % |
|---|---|---|
| Rhodium Oxide (supported on vulcan*) | 6.1 | 2.0 |
| GDE, unused | 0.5 | 0.8 |
| GDE, after activation and operation | 1.1 | 0.3 |

*Vulcan here means Vulcan XC-72 active carbon supplied by Cobalt Corp.

The metal/metal oxide mix catalyst may be made in other ways. For example, the dehydrated carbon supported metal oxide from above can be subjected to 100% hydrogen for several hours at room temperature. In the case the treatment is made at higher temperature then the sample is cooled to room temperature under argon. Incorporation of this catalyst into an electrode and exposure to $HCl/Cl_2$ and oxygen only initially dissolves some of the rhodium metal, as in time an oxide is formed to obtain stable cell voltages. Similarly, even before exposure to corrosive electrolyte, as the catalyst can be sintered in air as part of the assembly process to form a gas diffusion electrode, the sintering step can serve as a preliminary source of rhodium oxide as well.

For those applications where a carbon support is not desired, a high surface area unsupported metal oxide can be prepared. This process can begin with a carbon supported hydrated metal oxide, prepared as described above. Then, the supported metal oxide is subjected to a controlled heated air environment between 250–350° C., but preferably around 300° C. These conditions are selected to burn away the carbon support, which is now acting as a template to produce high surface area metal oxide particles, while avoiding sintering of the metal oxide particles into larger aggregates. After all carbon has been oxidized away, a final high temperature treatment is employed to remove all water of hydration, as noted above.

As mentioned before, the gas diffusion electrodes of the invention are comprised of a web, preferably carbon cloth provided with an electrocatalytically effective amount of the rhodium/rhodium oxide catalyst on at least one side of the electrode. Preferably, the catalyst is applied with a hydrophobic binder, such as Teflon® (polytetrafluoroethylene) commercialized by DuPont, U.S.A. Typically, the gas diffusion electrode structures may be similar to the commercially available ELAT™ (E-TEK, Inc., Natick, Mass.). Here, a carbon cloth serves as the web and a layer of SAB (Shawinigan Acetylene Black) mixed with Teflon serves as the wetproofing layer on each side of the web. Finally, layers of Vulcan-supported rhodium catalyst are coated onto one side of the assembly. After the final coat, the assembly may be sintered in air at a temperature sufficient to cause the Teflon to flow, typically 300–350° C. This double sided structure is designed with the intent to create an electrode that both achieves good gas distribution and contact with the catalyst while providing a hydrophobic barrier to prevent flooding of the electrode due to any liquid, i.e. water, which can be present during operation. Allen et al. in U.S. Pat. No. 4,293,396 further describe the construction of this type of gas diffusion electrode.

There are other carbon cloth based electrode structures that work as well or better than the ELAT electrodes and show some surprising results. First, suitable performances have been found with electrodes constructed with only one layer of wetproofing material and one catalyst layer on the carbon web. This construction eliminates the need of an additional coat on the "backside", that is, the side of the electrode exposed to the gas feed. This is called a single sided electrode. Second and most surprisingly, it has been found that a carbon web coated with just the supported or blended catalyst on the front face performs as well or better than any of the other embodiments. This is surprising in that one would expect such an open structure to be readily subjected to flooding hindering the critical step of gas diffusion. This last form of gas diffusion electrode is called a "Flow-through Electrode" to emphasize the macro porous nature of the electrode.

For all types of electrodes, the control of the performance and behavior in corrosive environments is achieved by the level of Teflon or hydrophobic binder in the catalyst-containing layer, the total weight of solids coated on the web, the weight percent metal on the carbon support (or surface area for the unsupported catalysts), and typically, a final layer of a ionomer applied to the face or front of the gas diffusion electrode. A well-known ionomer is Nafion®, commercialized by DuPont and available a water-alcohol solution (conventionally called "Liquid Nafion"). Such solutions come as a 5–10% wt ionomer with an equivalent weight of 1,100 or less. Typical levels of Teflon in the catalyst mix are 5–80% by weight, more preferably 30–70% by weight. The total weight of solids varies by electrode type, but ranges from 0.5 to 25 mg/cm$^2$, while the metal loading on the support ranges from 5–60% wt, with 20–40% being a preferred range with 0.1 to 3 mg/cm$^2$ of catalyst. The Nafion ionomer coated on the face can vary from 0.1 to 2 mg/cm$^2$, although 0.6–0.8 mg/cm$^2$ is preferred. FIG. 2 is a schematic to delineate these various forms of gas diffusion electrode.

The cell with gas diffusion electrodes often is constructed with a membrane separating the cathode from the anode compartment. This is used principally to inhibit loss of current efficiency when the chlorine gas formed at the anode migrates to the cathode and is reduced back to chloride instead of the intended oxygen reduction. To minimize the chlorine migration, ion exchange membranes such as Nafion® 430, 324, 117, 115, and 112 can be used (DuPont, Wilmington, Del.). Similarly, membranes composed of porous supports modified with ionomer can be employed, as well as macro porous, and micro porous separators.

If necessary, one can activate the catalyst-containing electrode. The purpose of this step is to create a mixed-metal catalyst consisting of both rhodium oxide and rhodium metal. Thus, any specific activation step will depend on the initial form of the catalyst. For those electrodes starting with the rhodium oxide catalyst, several methods are available for activation. One can assemble the cell, and prior to introducing oxygen at the cathode, evolve hydrogen under a flow of an inert gas for a few hours. Similarly, hydrogen evolution could be introduced with the electrodes in a separate apparatus prior to cell assembly. As mentioned before, the electrode can also be subjected to hydrogen gas in a furnace at low to moderate temperatures (ambient to 55° C. or above), or reacted with chemical reductants. While activation could be performed on the catalyst prior to making a GDE, the actual processing steps of GDE manufacture may alter the catalyst. Thus, the preferred activation is performed on the electrode assembly.

Figure 1:
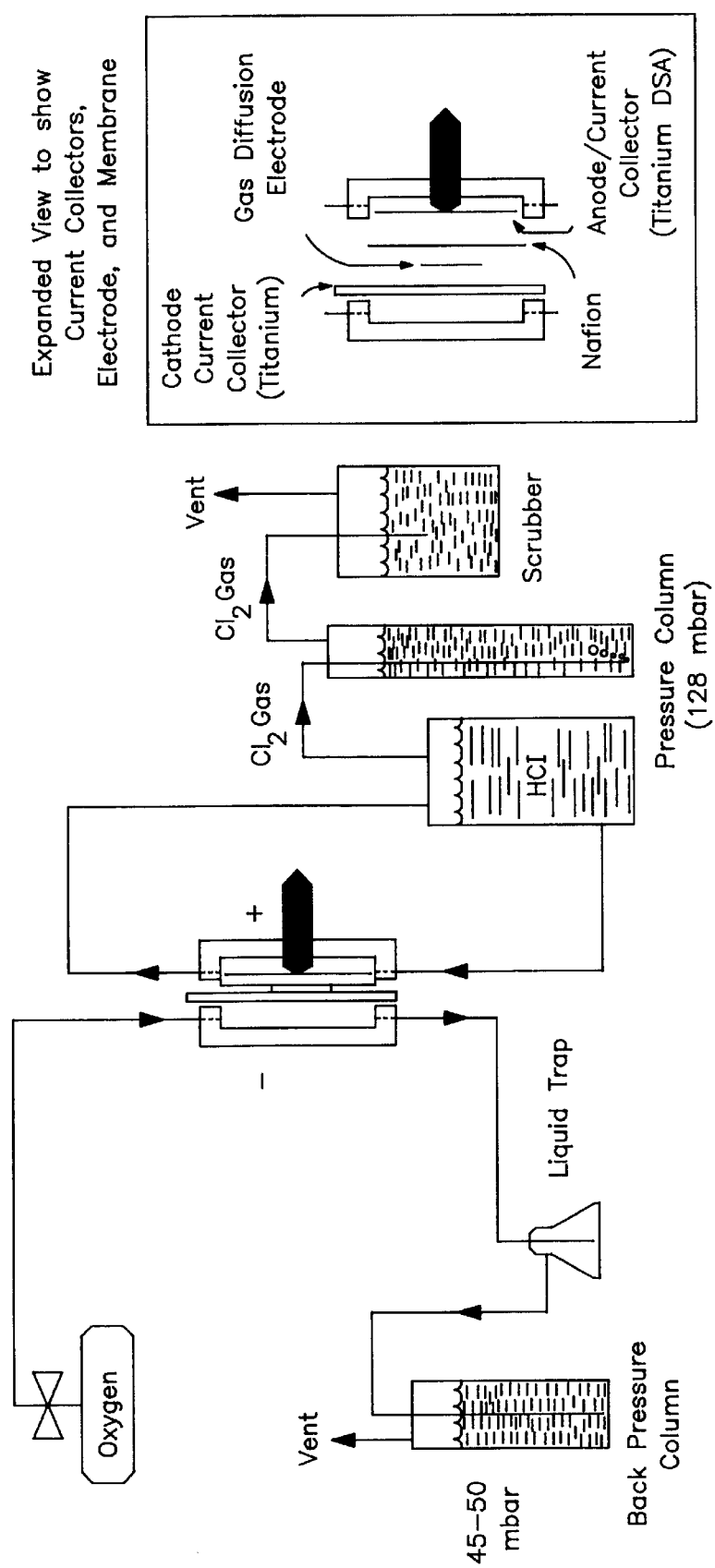
FIG. 1 is a schematic of a flow system for the generation of Cl$_2$ from HCl using an oxygen depolarized gas diffusion electrode.
Figure 2:
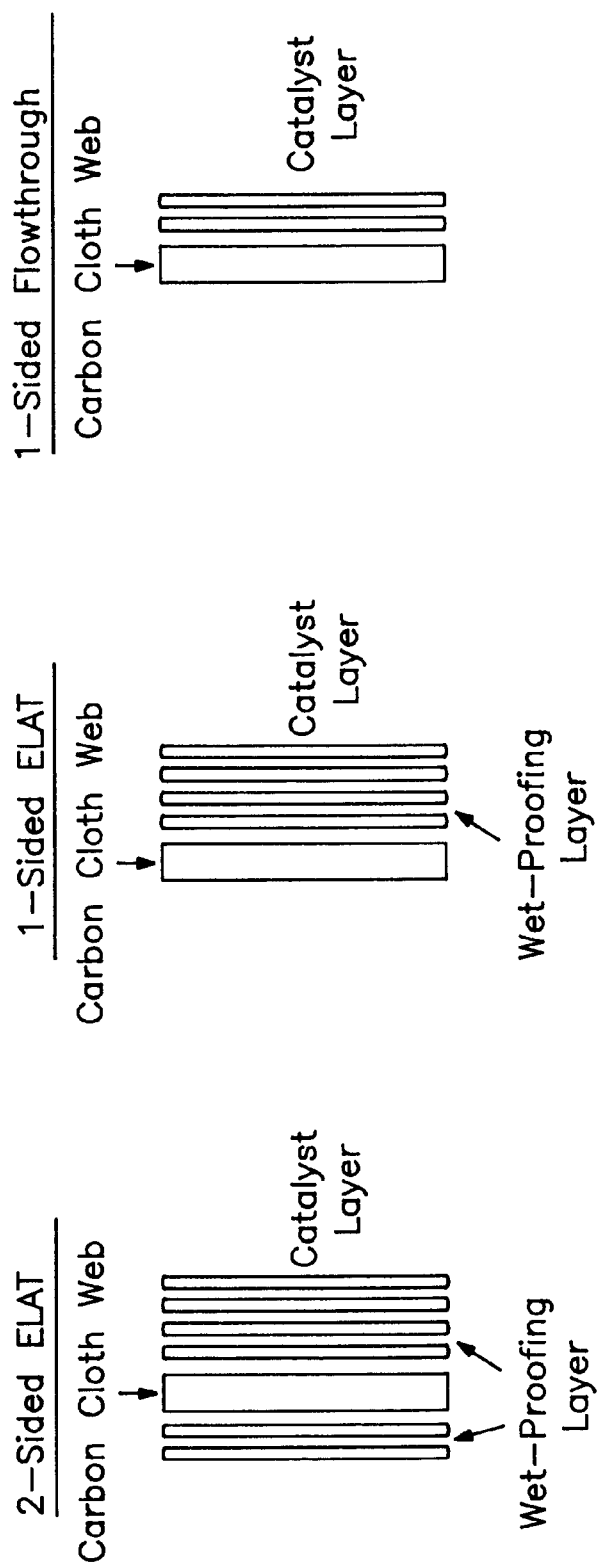
FIGS. 2A to 2C are schematics of three types of gas diffusion electrodes: A) ELAT, B) Single-sided ELAT, and C) Flow-through Electrode.

In the following examples, there are described several preferred embodiments to illustrate the invention. However, it is to be understood that the invention is not intended to be limited to the specific embodiments.

EXAMPLE 1

A rhodium oxide/rhodium catalyst on Vulcan XC-72 was prepared as follows. 9.43 g of RhCl$_3$oxH$_2$O (39.78% given as rhodium metal) were dissolved in 2 liters of deionized (D.I.) water at room temperature and the resulting solution was added to a dispersion of 8.75 g of Vulcan XC-72 in 500 ml of D.I. water. The mixture was stirred to maintain a uniform carbon slurry while slowly adding (2–3 ml/min) a 0.5 molar solution of ammonium hydroxide. A total of 220 ml of the ammonium hydroxide was theoretically required to form Rh(OH)$_3$ and a 10 to 20% excess of ammonium hydroxide was added to maintain a basic pH. The basic slurry was then stirred at 60–70° C. for 30–60 minutes and was then filtered hot. The filter cake was washed with about 200 ml D.I. water at 60–70° C. and then was dried in air at 125° C. for 15 hours. The resulting catalyst cake was then ground to a fine powder and heated at 600° C. under flowing argon gas to dehydrate the catalyst. The load of catalyst on carbon was 30%, given as rhodium metal.

EXAMPLE 2

The catalyst powder of Example 1 was heated at 500° C. for 30 minutes under flowing hydrogen gas to further reduce some of the rhodium oxide to rhodium metal.

EXAMPLE 3

A catalyst sample of high surface area, unsupported rhodium as described in Example 1, with the only exception of the heating treatment at 600° C., which was omitted. 6.156 g of the fine powder of rhodium-oxide supported on Vulcan XC-72 were evenly spread over a watch glass surface and the watch glass was placed in a muffle furnace with the furnace door slightly open. The furnace temperature was slowly raised over 6 to 8 hours to 300° C. and the temperature was maintained at 300° C. for about 16 hours. The watch glass was then removed from the furnace and was allowed to cool to room temperature. The resulting powder was mixed to obtain an uniform mixture which was then spread evenly over the watch glass surface again. The watch glass was then heated in the muffle furnace at 300° C. for 72 hours with the door slightly open and after cooling to room temperature, there were obtained 2.245 g of black powder with a surface area of 250 m$^2$/g (Nitrogen BET analysis).

EXAMPLE 4

The catalysts of Examples 1 to 3 and commercially available platinum on Vulcan XC-72 (for example from E-Tek, Inc.) were used to prepared electrodes as follows:

1. ELAT: A web of carbon cloth with a warp-to-fill ratio of unity and about 25 to 50 yarns per inch, and a 97–99% of carbon content was selected from a commercially available product with a thickness of 5 to 50 mils preferably with a thickness of 10–15 mils. A mixture of fluorinated polymer (Teflon) and SAB was coated on each side of the carbon cloth at a coverage of 8 to 10 mg/cm$^2$ with air drying at room temperature after each coat. Then, a mixture of the powdered catalyst and Teflon was coated on one side of the carbon web with one to eight coats to obtain a layer of 0.5 to 2 mg of catalyst per square cm. After the final coat, the carbon cloth was heated to 340° C. for 20 minutes.

2. Single-sided ELAT: The above procedure for preparation of the ELAT was repeated except the SAB/Teflon mixture was applied to only one side of the carbon cloth with a loading of 4 to 5 mg/cm$^2$. The catalyst coat was applied on the same side as the side receiving the SAB/Teflon.

3. Flow-through Electrode: A carbon cloth with the same specifications for the ELAT electrode was selected and 2 to 5 coats of a mixture of catalyst powder and Teflon were applied to one side of the carbon cloth. The coated fabric was then heated at 340° C. for about 20 minutes to obtain 1.03 mg/cm$^2$ of rhodium metal. The final heating step of sintering step is believed to melt the Teflon to distribute it across the carbon catalyst and to form some rhodium oxide. However, the sintering step may be successfully omitted.

EXAMPLE 5

The electrodes of Example 4 were assembled into the electrochemical cell of FIG. 1 as the cathode. The electrodes were subjected to an in-situ activation treatment. A stream of an inert gas, such a nitrogen or argon, was fed to the cathode, so that hydrogen was generated at the cathode upon feeding electric current. A high flow rate of inert gas was used to avoid hydrogen build up in the cell and the in situ generation of hydrogen (electrochemical activation of the cathode) was effected for about 2.5 hours although it could be 1 to 5 hours or less.

An alternative activation could be effected by placing the electrode in a hydrogen filled vessel at 55 to 60° C. for 1 to 2 hours.

The electrode could also be treated with a chemical reductant by soaking the electrode with 10% aqueous isopropyl alcohol solution of hydrozine or other chemical reductant. The electrode is subjected to the chemical reductant at 55° C. for one hour, then soaked in D.I. water, dried at room temperature, and then placed in the cell of FIG. 1 as the cathode. Other reducing agents include hydrides, hydroxylamine, ascorbic acid and other organic or inorganic reducing agents.

The test cell of FIG. 1 had a 2 mm gap between the cathode and the anode. However, equivalent results were obtained with a "zero-gap" adjustment, where the cathode and the anode were both pressed against the membrane. The exposed electrode surface area was 6.45 cm$^2$ and the membrane was Nafion 430. The anode was titanium mesh activated with ruthenium oxide catalyst. Oxygen was red to the cathode at a rate of up to five-fold stoichiometric excess at 45–50 mbar pressure and 17% aqueous hydrogen chloride electrolyte (184±10 g/l) was fed to the anode. The said electrolyte was recirculated until 50% of the hydrogen chloride was depleted and then fresh electrolyte was added. The 50% depletion leads to a temporary increase in cell voltage, and is exhibited as "spikes" on a graph of voltage versus time. The electrolyte flow rate was 4 ml per minute or 0.372 m$^3$/hour/m$^2$ at a backpressure of 120 mbar. Unless stated otherwise, the cells were run at 3 kA/m$^2$ and all voltages were uncorrected for current collector resistance. The temperature of the cell and electrolyte was held at 55° C.±5° C. with heating tape applied to the cell metal end plates and an air conditioning unit.

In commercial electrochemical plants, two common temporary operation modes are encountered which reflect the situations of either scheduled repair or replacement of worn-out components, or the unscheduled failure of these components. For the scheduled delays in production, one can induce a "controlled" shutdown, whereby elements of the plant are systematically turned off or attenuated to a lower operational level. In particular chlorine can be degassed on the anode side and oxygen can be substituted with nitrogen on the cathode side. For the unscheduled failures ("uncontrolled" shutdowns), typically components of the plant are subjected to the most rigorous of operating conditions during these times. In particular, chlorine and oxygen are left in the cell and as a consequence severe corrosion conditions arise. Since it is an object of this invention to provide a catalyst and gas diffusion electrode capable of operation in an electrochemical plant, the catalyst-electrode assemblies were tested in simulated controlled and uncontrolled shutdowns.

These two interventions differ in the manner of turning off various components. For the controlled shutdown, an inert gas was fed to the cathode, and the rectifier current was slowly decreased, followed by turning the rectifier off. Once the rectifier was off, the pumps were halted. For the uncontrolled shutdown, oxygen flow was halted to the cathode while the rectifier and pump circuits were suddenly shut off, without the gradual decrease in current or flow rate.

Figure 3:
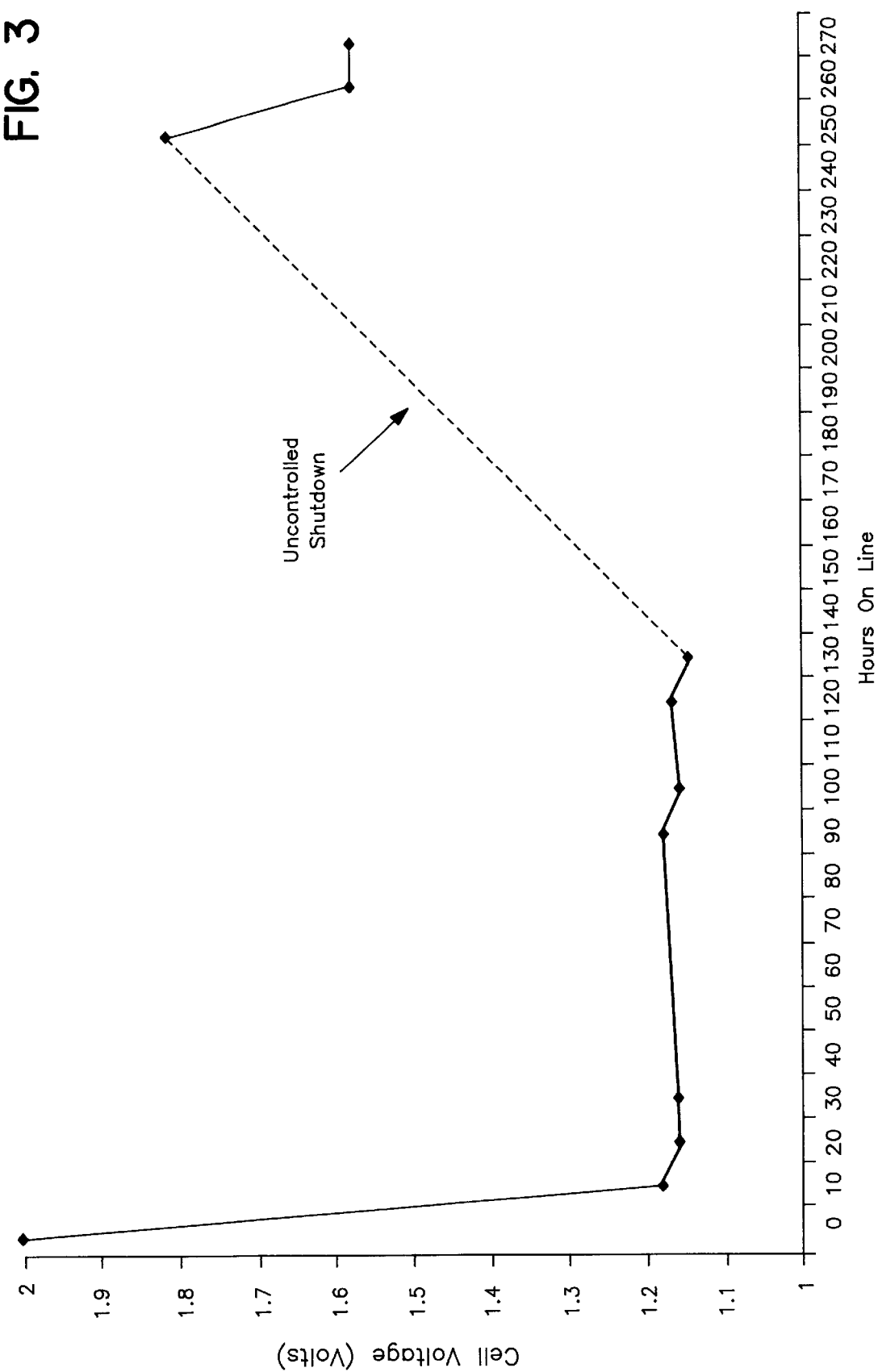
FIG. 3 is a graph of typical platinum catalyst data of an ELAT electrode with 30% Pt/C, catalyst loading 1.1 mg/cm$^2$, coated with 0.70 mg/cm$^2$ Nafion, operated in HCl/Cl$_2$ solution at 3 kA/m$^2$.

FIG. 3 is a graph of typical voltage versus hours of operation demonstrating the effect of an uncontrolled shutdown on a typical ELAT platinum-catalyzed electrode. Note that after the uncontrolled shutdown, the catalyst activity was lost, and nearly 400 mV increase of cell voltage were recorded after 120 hours of shutdown. In other experiments, catalyst activity was not restored after various attempts of an in situ activation after an uncontrolled shutdown.

Figure 4:
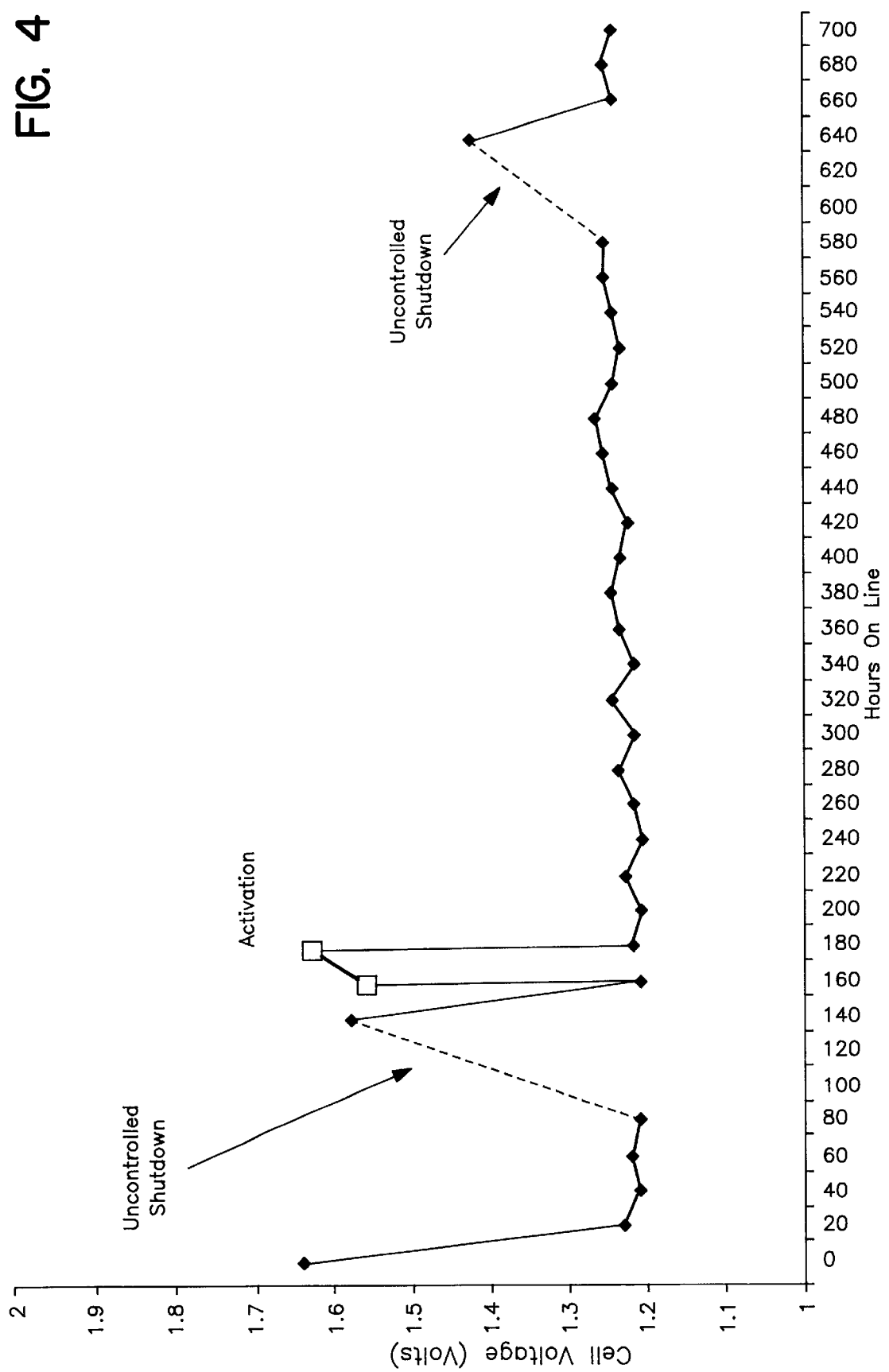
FIG. 4 is a graph of the -rhodium oxide catalyst of Example 1, incorporated in the ELAT electrode with a load of 1.37 mg/cm$^2$ (given as rhodium metal), coated with 0.63 mg/cm$^2$ Nafion, operating in HCl/Cl$_2$ solution at 3 kA/m$^2$.

FIG. 4 is a graph of a similarly constructed electrode under identical operating conditions, except that the platinum catalyst of the invention was substituted with the rhodium oxide catalyst of Example 1 with in-situ activation. In contrast to the prior art platinum electrodes, the two cycles of uncontrolled shutdown for 80 and 60 hours, respectively, did not harm the catalyst as virtually no increase in cell potential was recorded after normal operation had been restored. This set of data shows that a rhodium-based catalyst can attain acceptable performance when operated under actual plant conditions.

Figure 5:
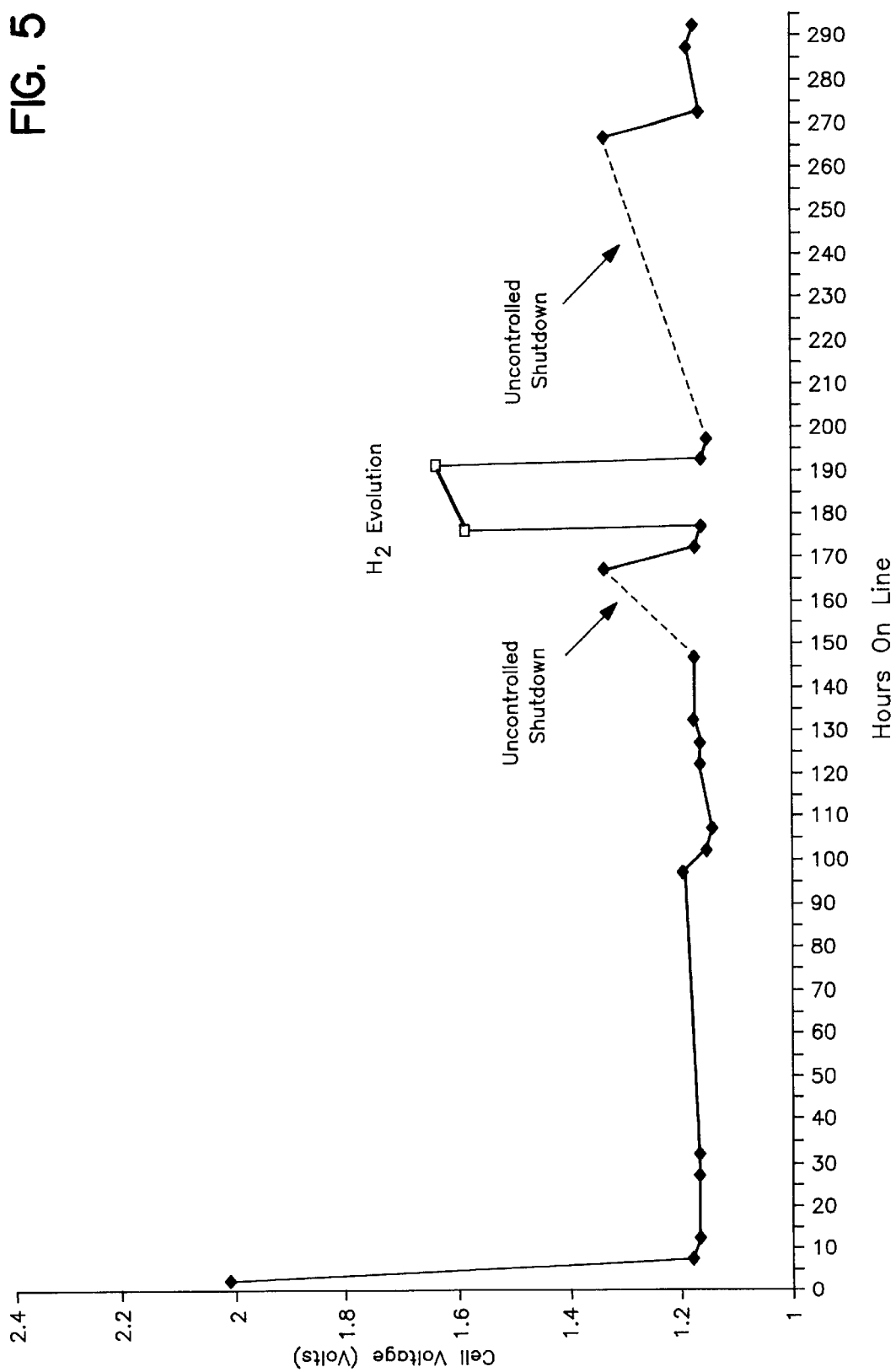
FIG. 5 is a graph of the voltage/time relationship for an ELAT electrode incorporating the reduced catalyst of Example 2, with a load of 1.05 mg/cm$^2$ (given as rhodium metal), coated with 0.71 mg/cm$^2$ Nafion, operating in HCl/Cl$_2$ solution at 3 kA/m2.

FIG. 5 illustrates the surprising result of an ELAT electrode, containing the reduced catalyst of Example 2 exhibiting excellent stability and good performance. Two cycles of uncontrolled shutdown for 20 and 60 hours, respectively, show that the catalyst activity was not impeded. Furthermore, shutting down the oxygen supply to the cathode did not impair the catalyst either, as shown by the section labeled "H$_2$ evolution". FIGS. 4 and 5 together show that these unexpected properties can be achieved by starting either with prevailing status of the metal, or the metal oxide.

Figure 8:
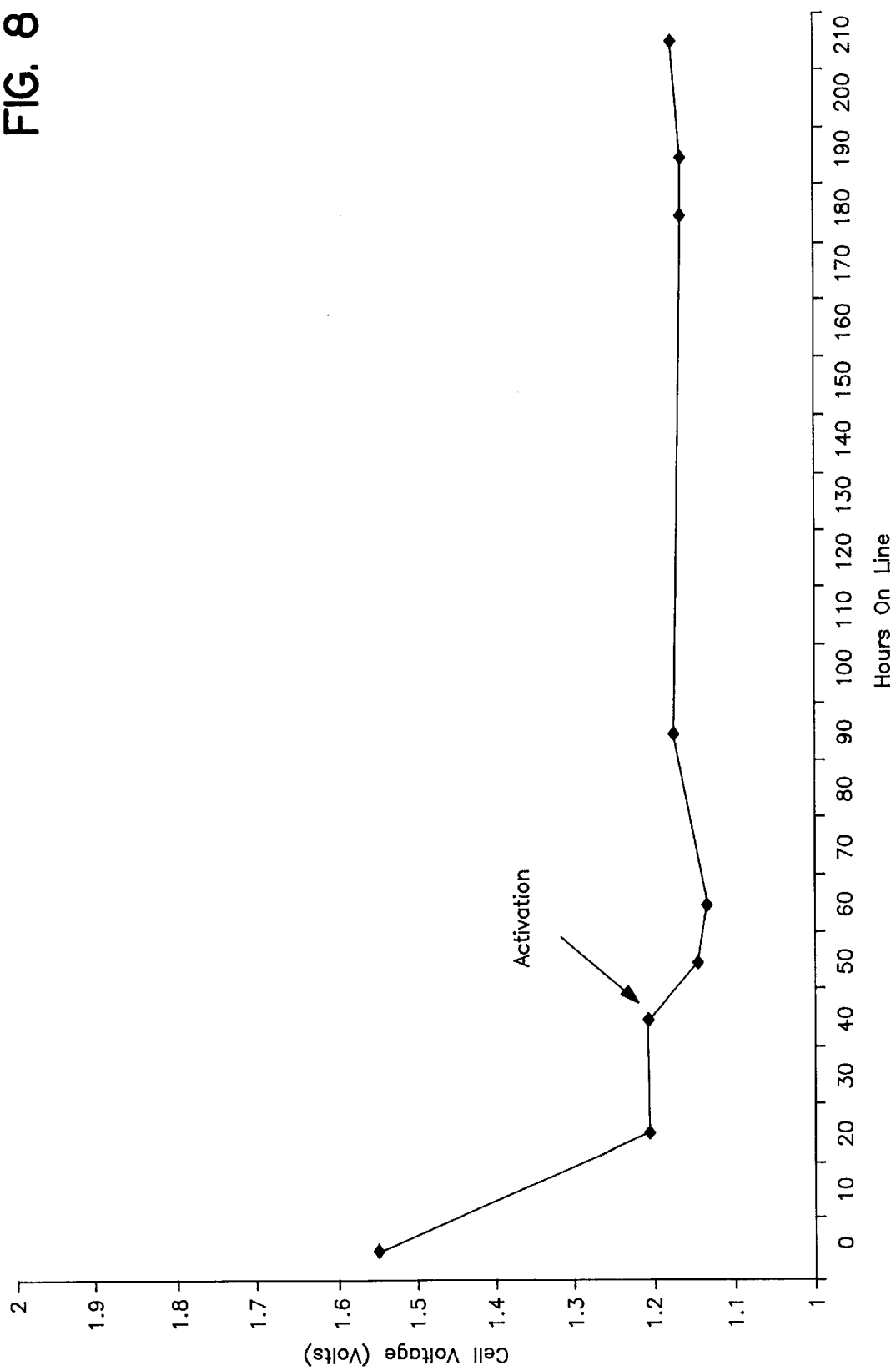
FIG. 8 is a graph of voltage/time for a single sided ELAT electrode incorporating the catalyst of Example 1, with a load of 1.01 mg/cm$^2$, given as rhodium metal, coated with 0.70 mg/cm$^2$ Nafion, operating in HCl/Cl$_2$ solution at 3 kA/m$^2$.

FIG. 8 is a graph of the catalyst of Example 1 assembled as a single sided ELAT. In comparing this electrode to the ELAT electrode of FIG. 4, there was no significant difference observed in activity or durability. Thus, the elimination of coats on the backside does not impeded performance and appreciable savings in electrode manufacturing steps and cost are realized.

Figure 6:
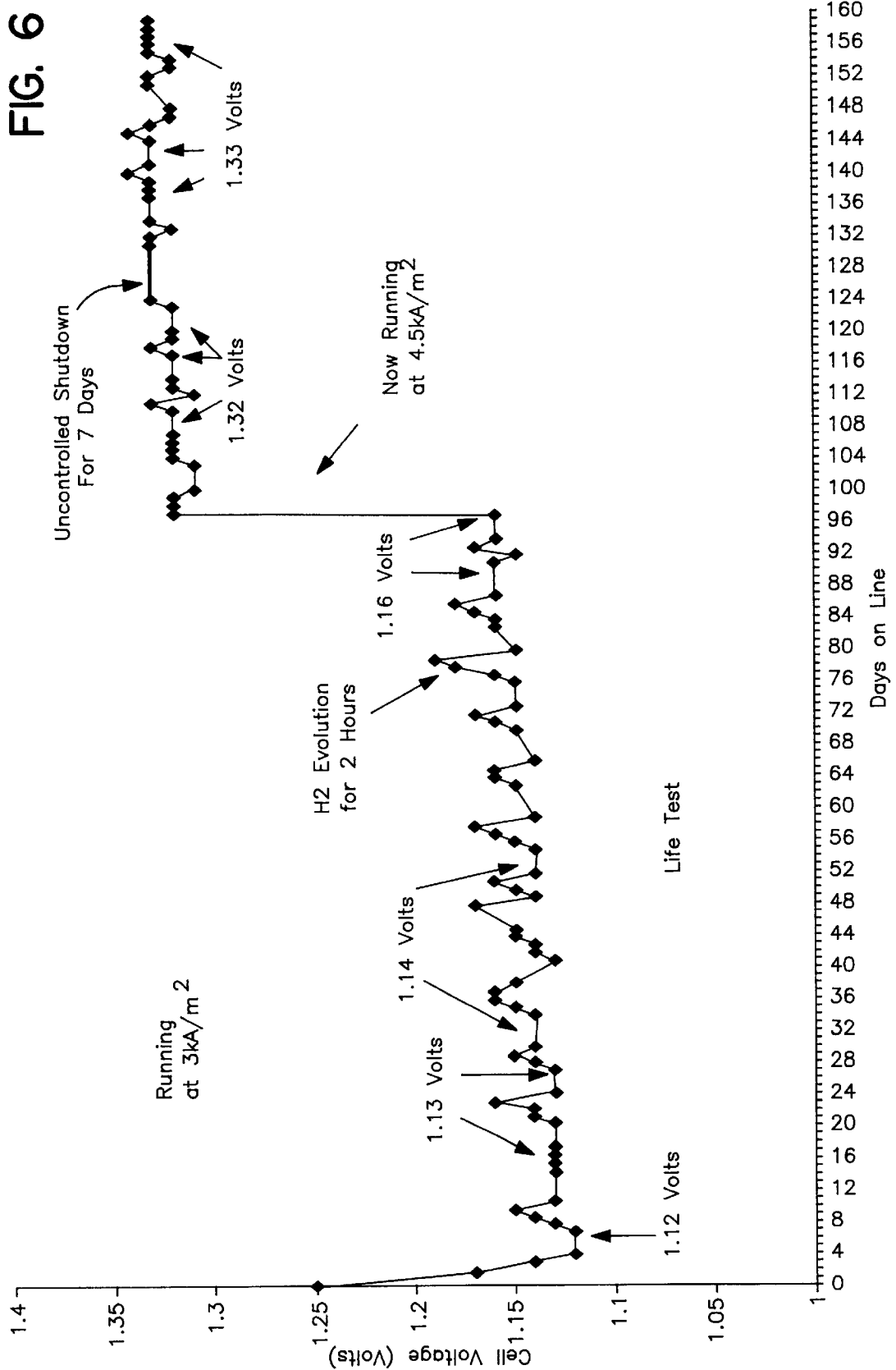
FIG. 6 is a graph of voltage/time for a Flow-through electrode incorporating the reduced catalyst of Example 2, with a load of 1.2 mg/cm$^2$ given as rhodium metal, coated with 0.73 mg/cm$^2$ Nafion, operating in HCl/Cl$_2$ solution at 3 kA/m$^2$ and 4.5 kA/m$^2$.

FIG. 6 is a graph which illustrates an unexpected long term performance from the Flow-through electrode design.

Since the Flow-through electrode is considered macro porous and has not a wet-proofing layer, one would anticipate that long term operation in an actual system would lead to eventual electrode flooding with the water formed during operation. FIG. 6 reports on 160 days of continuous operation, except for a seven-day period of uncontrolled shutdown. For the first 100 days of operation at 3 kA/m$^2$, the cell voltage increased no more than 40 mV. Then the operating current was increased at this stage to 4.5 kA/m$^2$ to accelerate aging and deterioration of the catalyst and/or electrode. The electrode lost less than 15 mV for the next 60 days, and this data included an uncontrolled shutdown for seven days. Thus, it is shown that an electrode without the wetproofing layer typically employed up to now in the known practice can perform for a significant duration. Furthermore, this data serves to further emphasize that the metal—metal oxide catalyst is not metastable; on the contrary it is indeed an unanticipated composition of rhodium that is long-lived and electroactive in corrosive environments.

Figure 7:
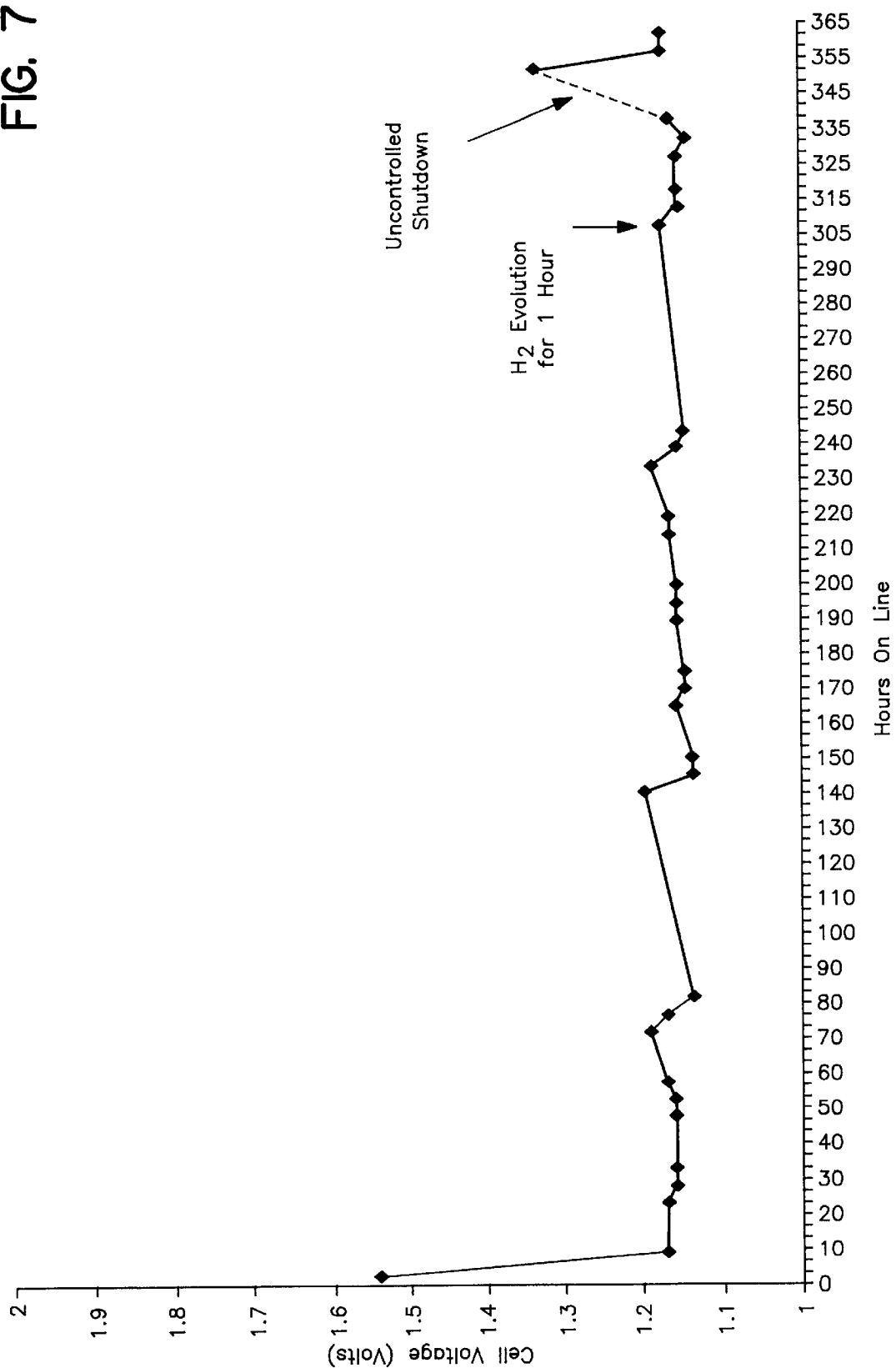
FIG. 7 is a graph showing the performance of a Flow-through electrode similar to that of FIG. 6, but without previous sintering.

It is shown here a novel Flow-through electrode that is constructed without the final sintering step. FIG. 7 demonstrates that an electrode identical to FIG. 6 can operate in the HCl/Cl$_2$ system for a significant period of time without previous sintering. Thus, an electrode designed without additional wetproofing coats, coated with catalyst on only one side, and not in need of a final sintering step may be the least expensive electrode to manufacture, but still capable of performing to a comparable level of the electrodes requiring more complex assembly and potentially eliminates any need for activation.

As previously discussed, an activation step often provides the transformation of the starting catalyst into the mixed metal—metal oxide catalyst. The results of various activation procedures are summarized below in Table 2 using an electrode which incorporated a catalyst made of 30% rhodium metal on carbon with a load of 1.03 mg/cm$^2$ given as rhodium metal, coated with 0.69 mg/cm$^2$ Nafion, and previously sintered in air at 340° C. to create some of the oxide. The most efficacious is the in-situ activation, whereby hydrogen is evolved. However, the other methode may offer some additional advantage in cost, processing time, or electrode handling.

TABLE 2

Summary or Activation Methods, cell voltage

| Activation Procedure | Performance prior to Activation, 3 kA/m$^2$ | Performance after Activation, 3 kA/m$^2$ |
|---|---|---|
| In-situ | 1.25 V | 1.17 V |
| Reduce with H$_2$ at 55° C. prior to cell assembly | 1.28 | 1.18 V |
| Chemical (hydrazine) | 1.27 V | 1.21 V |

In summary, a new composition of rhodium has been found that performs as an electrocatalyst in a gas diffusion electrode in corrosive systems like HCl/Cl$_2$. This catalyst is unanticipated by the prior art due to it being a mixed species consisting of both the metal and metal oxide, neither of which, by themselves, may be adequate for HCl/Cl$_2$ electrolysis. The new electrode structure is inexpensive to manufacture, but it well behaved in electrochemical solutions.

Various modifications of the electrodes and cells and method of the invention may be made without departing from the spirit or scope thereof and it is to be understood that the invention is intended to be limited only as defined in the appended claims.

What is claimed is:

1. A gas diffusion electrode comprising an electrically conductive web provided on at least one side thereof with a coating containing a rhodium—rhodium oxide catalyst on a carbon black support.

2. The electrode of claim 1 wherein the coating is a rhodium—rhodium oxide catalyst on a carbon black support.

3. The electrode of claim 1 wherein the coating is an unsupported high surface area rhodium—rhodium oxide blended with conductive particles.

4. The electrode of claim 1 wherein the catalyst is a reduced catalyst obtained by means of a chemical reductant other than hydrogen prior to be used in the coating.

5. The electrode of claim 1 wherein the coating also contains a hydrophobic binder.

6. The electrode of claim 5 wherein the binder is fluorinated polymer.

7. The electrode of claim 1 wherein the web comprises carbon cloth, carbon paper, or a metal mesh.

8. The electrode of claim 1 wherein the web contains the coating on both sides.

9. The electrode of claim 1 wherein the web contains a wetproofing layer on at least one side.

10. An electrochemical cell comprising an anode and cathode, an anode compartment and a cathode compartment divided by a separator, the improvement comprising the cathode being a gas diffusion cathode of claim 1.

11. An electrochemical cell of claim 10 wherein the separator comprises an ion-exchange membrane, ionomer-impregnated supports, macro porous or micro porous structures.

12. A process for electrolyzing an aqueous solution of hydrogen chloride to chlorine in an electrochemical cell of claim 10 comprising introducing aqueous hydrogen chloride into the anode compartment and oxygen at the gas diffusion electrode while impressing an electric current on the cell.

13. A method for preparing rhodium—rhodium oxide catalyst by dissolving a rhodium chloride salt in a solution with carbon black, precipitating the metal by raising the pH, filtering the solids, drying and heat-treating the remaining solids under argon at 600° C.

14. A method for preparing high surface area rhodium—rhodium oxide catalyst by dissolving rhodium chloride salt in a solution with carbon black, precipitating the metal by raising the pH, filtering the solids, drying, and heat treating the remaining solids under argon at 600° C.

15. The method of claim 14 wherein the catalyst is reduced in the presence of hydrogen prior to be used in the coating.

16. The method of claim 14 wherein the catalyst is reduced by means of a chemical reductant other than hydrogen prior to be used in the coating.

17. A method for preparing high surface area rhodium—rhodium oxide catalyst by dissolving a rhodium chloride salt in a solution with carbon black, precipitating the metal by raising the pH, filtering the solids, drying, and slowly burning off the carbon in an air-filled oven at 300° C.

18. The method of claim 17 wherein the catalyst is reduced in the presence of hydrogen prior to be used in the coating.

19. The method of claim 17 wherein the catalyst is reduced by means of a chemical reductant other than hydrogen prior to be used in the coating.

20. A composition of rhodium—rhodium oxide supported on carbon black for use in gas diffusion electrodes.

* * * * *